(12) United States Patent
Amitai

(10) Patent No.: US 11,892,635 B2
(45) Date of Patent: Feb. 6, 2024

(54) COMPACT HEAD-MOUNTED DISPLAY SYSTEM

(71) Applicant: LUMUS LTD., Ness Ziona (IL)

(72) Inventor: Yaakov Amitai, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 299 days.

(21) Appl. No.: 17/163,676

(22) Filed: Feb. 1, 2021

(65) Prior Publication Data

US 2021/0157150 A1 May 27, 2021

Related U.S. Application Data

(60) Continuation of application No. 16/260,161, filed on Jan. 29, 2019, now Pat. No. 10,908,426, which is a
(Continued)

(30) Foreign Application Priority Data

Apr. 23, 2014 (IL) .......................................... 232197

(51) Int. Cl.
*G02B 27/01* (2006.01)
*G02B 5/04* (2006.01)
(Continued)

(52) U.S. Cl.
CPC ........... *G02B 27/0172* (2013.01); *G02B 5/04* (2013.01); *G02B 5/3083* (2013.01);
(Continued)

(58) Field of Classification Search
CPC .... G02B 27/0172; G02B 5/04; G02B 5/3083; G02B 27/0025; G02B 27/0176;
(Continued)

(56) References Cited

U.S. PATENT DOCUMENTS 8,760,762 B1 6/2014 Kelly et al.
9,285,591 B1 3/2016 Gupta et al.
(Continued)

FOREIGN PATENT DOCUMENTS

CN 104503087 4/2015
DE 102019205138 10/2019
(Continued)

*Primary Examiner* — Collin X Beatty
(74) *Attorney, Agent, or Firm* — Mark M. Friedman

(57) ABSTRACT

There is provided an optical system, including a light-transmitting substrate (20) having at least two major surfaces (26) and edges, all optical prism (54) having at least a first (58), a second (56) and a third (60) surface, for coupling light waves having a given field-of-view into the substrate by total internal reflection, at least one partially reflecting surface located in the substrate, the partially reflecting surface being orientated non-parallelly with respect to the major surfaces of the substrate, for coupling light waves out of the substrate, at least one of the edges (50) of the substrate is slanted at an oblique angle with respect to the major surfaces, the second surface of the prism is located adjacent to the slanted edge of the substrate, and a part of the substrate located next to the slanted edge is substantially transparent, wherein the light waves enter the prism through the first surface of the prism, traverse the prism without any reflection and enter the substrate through the slanted edge.

5 Claims, 12 Drawing Sheets

Related U.S. Application Data division of application No. 15/305,933, filed as application No. PCT/IL2015/050422 on Apr. 21, 2015, now Pat. No. 10,809,528.

(51) Int. Cl.
  *G02B 5/30* (2006.01)
  *G02B 27/00* (2006.01)
  *G02B 27/28* (2006.01)
  *G02B 27/30* (2006.01)

(52) U.S. Cl.
  CPC ..... *G02B 27/0025* (2013.01); *G02B 27/0176* (2013.01); *G02B 27/283* (2013.01); *G02B 27/30* (2013.01); *G02B 27/0081* (2013.01); *G02B 2027/0123* (2013.01); *G02B 2027/0132* (2013.01); *G02B 2027/0178* (2013.01); *G02B 2027/0194* (2013.01)

(58) Field of Classification Search
  CPC .. G02B 27/283; G02B 27/30; G02B 27/0081; G02B 2027/0123; G02B 2027/0132; G02B 2027/0178; G02B 2027/0194
  USPC ..... 359/489.07, 630–640; 362/606, 610, 615
  See application file for complete search history.

(56) References Cited

U.S. PATENT DOCUMENTS

| | | | |
|---|---|---|---|
| 9,696,479 B2* | 7/2017 | Hugel | G02B 6/0031 |
| 11,187,905 B2* | 11/2021 | Amitai | G02B 27/286 |
| 2004/0085649 A1 | 5/2004 | Repetto | |
| 2007/0007157 A1 | 1/2007 | Buschmann et al. | |
| 2007/0064310 A1 | 3/2007 | Mukawa et al. | |
| 2007/0091445 A1* | 4/2007 | Amitai | G02B 27/0101 |
| | | | 359/630 |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0239422 A1 | 10/2008 | Noda | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2010/0020204 A1 | 1/2010 | Fleischer et al. | |
| 2010/0067110 A1* | 3/2010 | Hadad | G02B 5/04 |
| | | | 359/485.06 |
| 2010/0171680 A1 | 7/2010 | Lapidot et al. | |
| 2011/0194163 A1 | 8/2011 | Shimizu et al. | |
| 2012/0147361 A1 | 6/2012 | Mochizuki et al. | |
| 2012/0179369 A1 | 7/2012 | Lapidot et al. | |
| 2012/0182525 A1 | 7/2012 | Imai et al. | |
| 2013/0229717 A1 | 9/2013 | Amitai | |
| 2013/0276960 A1 | 10/2013 | Amitai | |
| 2013/0279017 A1 | 10/2013 | Amitai | |
| 2014/0118813 A1 | 5/2014 | Amitai et al. | |
| 2014/0118836 A1 | 5/2014 | Amitai et al. | |
| 2014/0118837 A1 | 5/2014 | Amitai et al. | |
| 2014/0126051 A1 | 5/2014 | Amitai et al. | |
| 2014/0126052 A1 | 5/2014 | Amitai et al. | |
| 2014/0126056 A1 | 5/2014 | Amitai et al. | |
| 2014/0126057 A1 | 5/2014 | Amitai et al. | |
| 2014/0126175 A1 | 5/2014 | Amitai et al. | |
| 2014/0226215 A1* | 8/2014 | Komatsu | G02B 27/0172 |
| | | | 359/631 |
| 2014/0293434 A1* | 10/2014 | Cheng | H04N 13/363 |
| | | | 359/630 |
| 2015/0138451 A1 | 5/2015 | Amitai | |
| 2015/0160460 A1 | 6/2015 | Komatsu et al. | |
| 2015/0198805 A1 | 7/2015 | Mansharof | |
| 2015/0205140 A1 | 7/2015 | Mansharof et al. | |
| 2015/0205141 A1 | 7/2015 | Mansharof et al. | |
| 2015/0260992 A1 | 9/2015 | Luttmann et al. | |
| 2015/0277127 A1 | 10/2015 | Amitai | |
| 2015/0293360 A1 | 10/2015 | Amitai | |
| 2016/0116743 A1 | 4/2016 | Amitai | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0187656 A1 | 6/2016 | Amitai | |
| 2016/0282622 A1 | 9/2016 | Hiraide | |
| 2016/0341964 A1 | 11/2016 | Amitai | |
| 2016/0349518 A1 | 12/2016 | Amitai et al. | |
| 2017/0045744 A1 | 2/2017 | Amitai | |
| 2017/0052376 A1 | 2/2017 | Amitai | |
| 2017/0052377 A1 | 2/2017 | Amitai | |
| 2017/0336636 A1 | 11/2017 | Amitai et al. | |
| 2017/0357095 A1 | 12/2017 | Amitai | |
| 2017/0363799 A1 | 12/2017 | Ofir et al. | |
| 2018/0039082 A1 | 2/2018 | Amitai | |
| 2018/0067315 A1 | 3/2018 | Amitai et al. | |
| 2018/0157057 A1 | 6/2018 | Gelberg et al. | |
| 2018/0210202 A1 | 7/2018 | Danziger | |
| 2018/0267317 A1 | 9/2018 | Amitai | |
| 2018/0275384 A1 | 9/2018 | Danziger et al. | |
| 2018/0292592 A1 | 10/2018 | Danziger | |
| 2018/0292599 A1 | 10/2018 | Ofir et al. | |
| 2018/0373039 A1 | 12/2018 | Amitai | |
| 2019/0011710 A1 | 1/2019 | Amitai | |
| 2019/0056600 A1 | 2/2019 | Danziger et al. | |
| 2019/0064518 A1 | 2/2019 | Danziger | |
| 2019/0155035 A1 | 5/2019 | Amitai | |
| 2019/0170327 A1 | 6/2019 | Eisenfeld et al. | |
| 2019/0208187 A1 | 7/2019 | Danziger | |
| 2019/0212487 A1 | 7/2019 | Danziger et al. | |
| 2019/0227215 A1 | 7/2019 | Danziger et al. | |
| 2019/0278086 A1 | 9/2019 | Ofir | |
| 2019/0285900 A1 | 9/2019 | Amitai | |
| 2019/0293856 A1 | 9/2019 | Danziger | |
| 2019/0339530 A1 | 11/2019 | Amitai | |
| 2019/0346609 A1 | 11/2019 | Eisenfeld | |
| 2019/0361240 A1 | 11/2019 | Gelberg | |
| 2019/0361241 A1 | 11/2019 | Amitai | |
| 2019/0377187 A1 | 12/2019 | Rubin et al. | |
| 2019/0391408 A1 | 12/2019 | Mansharof | |
| 2020/0033572 A1 | 1/2020 | Danziger et al. | |
| 2020/0041713 A1 | 2/2020 | Danziger | |
| 2020/0089001 A1 | 3/2020 | Amitai et al. | |
| 2020/0110211 A1 | 4/2020 | Danziger et al. | |
| 2020/0120329 A1 | 4/2020 | Danziger | |
| 2020/0133008 A1 | 4/2020 | Amitai | |
| 2020/0150330 A1 | 5/2020 | Danziger et al. | |
| 2020/0183159 A1 | 6/2020 | Danziger | |
| 2020/0183170 A1 | 6/2020 | Amitai et al. | |
| 2020/0200963 A1 | 6/2020 | Eisenfeld et al. | |
| 2020/0209667 A1 | 7/2020 | Sharlin et al. | |
| 2020/0241308 A1 | 7/2020 | Danziger et al. | |
| 2020/0249481 A1 | 8/2020 | Danziger et al. | |
| 2020/0278557 A1 | 9/2020 | Greenstein et al. | |
| 2020/0285060 A1 | 9/2020 | Amitai | |
| 2020/0292417 A1 | 9/2020 | Lobachinsky et al. | |
| 2020/0292744 A1 | 9/2020 | Danziger | |
| 2020/0292819 A1 | 9/2020 | Danziger et al. | |
| 2020/0310024 A1 | 10/2020 | Danziger et al. | |
| 2020/0326545 A1 | 10/2020 | Amitai et al. | |
| 2020/0371311 A1 | 11/2020 | Lobachinsky et al. | |
| 2021/0003849 A1 | 1/2021 | Amitai et al. | |
| 2021/0018755 A1 | 1/2021 | Amitai | |
| 2021/0033773 A1 | 2/2021 | Danziger et al. | |
| 2021/0033862 A1 | 2/2021 | Danziger et al. | |
| 2021/0033872 A1 | 2/2021 | Rubin et al. | |
| 2021/0055218 A1 | 2/2021 | Aldaag et al. | |
| 2021/0055466 A1 | 2/2021 | Eisenfeld | |
| 2021/0055561 A1 | 2/2021 | Danziger et al. | |
| 2021/0063733 A1 | 3/2021 | Ronen | |
| 2021/0072553 A1 | 3/2021 | Danziger et al. | |
| 2021/0099691 A1 | 4/2021 | Danziger | |

(56) References Cited

U.S. PATENT DOCUMENTS

2022/0004007 A1    1/2022   Bhakta
2022/0107499 A1    4/2022   Amitai

FOREIGN PATENT DOCUMENTS

JP     2003140081     5/2003
WO    2014033035     3/2014

\* cited by examiner

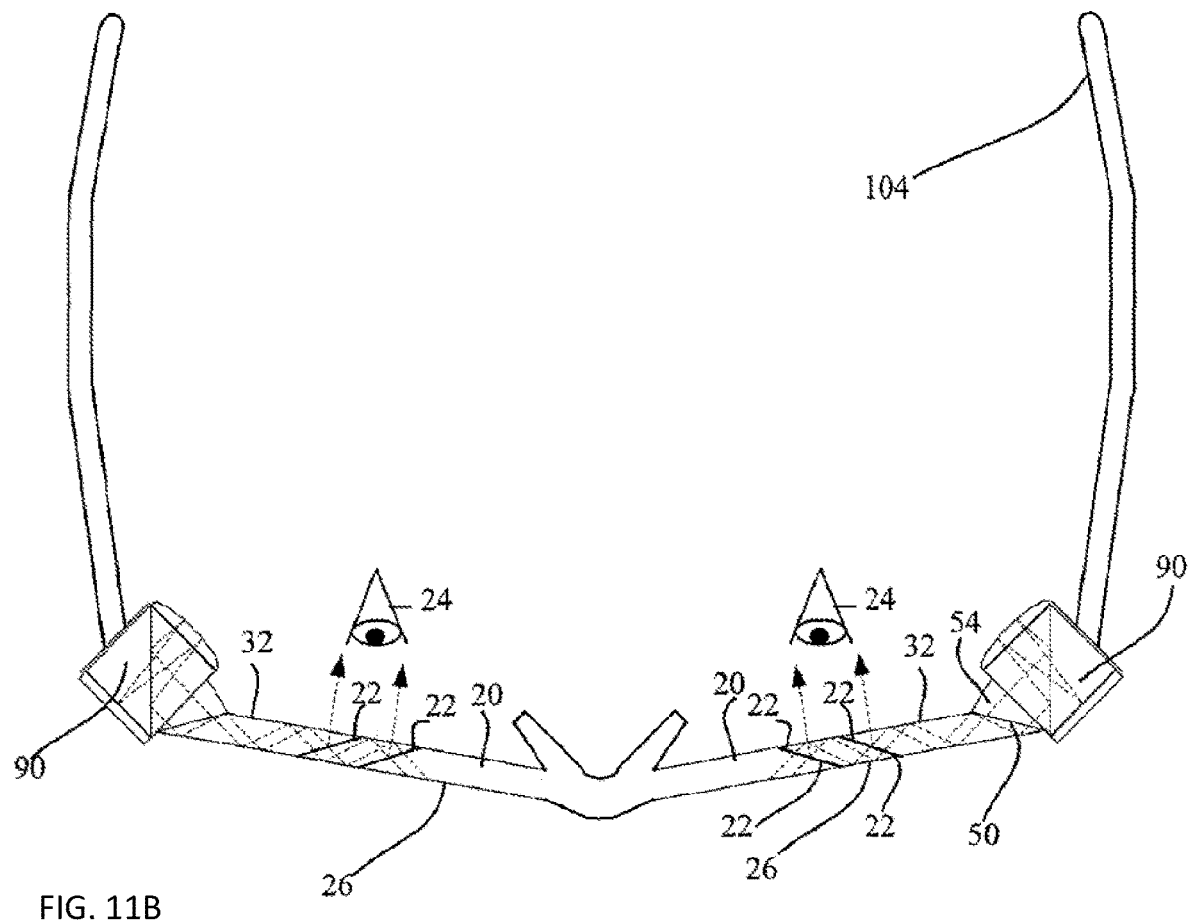
FIG. 11B
FIG. 12
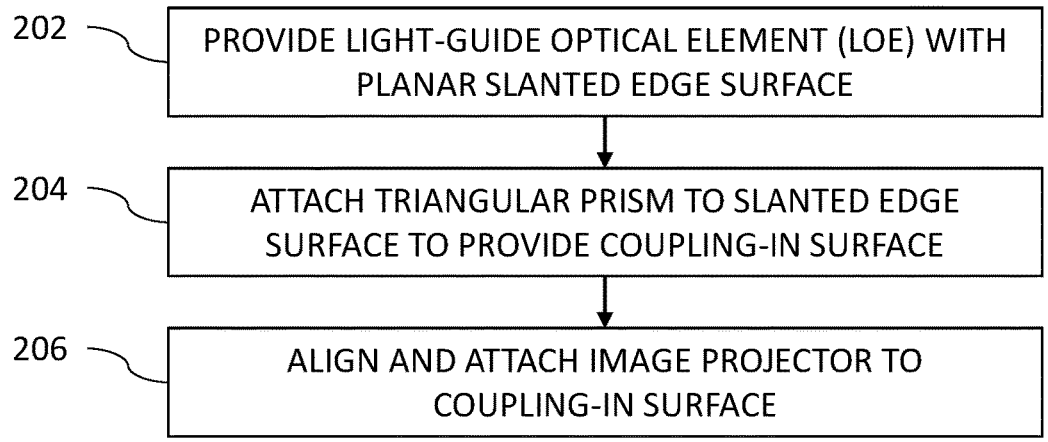

COMPACT HEAD-MOUNTED DISPLAY SYSTEM

FIELD OF THE INVENTION

The present invention relates to substrate-guided optical devices, and particularly to devices which include a plurality of reflecting surfaces carried by a common light-transmissive substrate, also referred to as a light-guide element.

The invention can be implemented to advantage in a large number of imaging applications, such as portable DVDs, cellular phones, mobile TV receivers, video games, portable media players or any other mobile display devices.

BACKGROUND OF THE INVENTION

One application for compact optical elements concerns head-mounted displays (HMDs), wherein ark optical module serves both as an imaging lens and a combiner, wherein a two-dimensional image source is imaged to infinity and reflected into the eye of an observer. The display source may originate directly from a spatial light modulator (SLM), such as a cathode ray tube (CRT), a liquid crystal display (LCD), an organic light emitting diode array (OLED), a scanning source or similar devices, or indirectly, by means of a relay lens, an optical fiber bundle, or similar devices. The display source comprises an array of elements (pixels) imaged to infinity by a collimating lens and transmitted into the eye of the viewer by means of a reflecting, or partially reflecting, surface acting as a combiner for non-see-through and see-through applications, respectively. Typically, a conventional, free-space optical module is used for these purposes. As the desired field-of-view (FOV) of the system increases, however, such a conventional optical module becomes larger, heavier and bulkier, and therefore, even for a moderate performance device, is impractical. This is a major drawback for all kinds of displays and especially in head-mounted applications, wherein the system should necessarily be as light and as compact as possible.

The strive for compactness has led to several different complex optical solutions, all of which, on the one hand, are still not sufficiently compact for most practical applications, and, on the other hand, suffer major drawbacks with respect to manufacturability. Furthermore, the eye-motion-box (EMB) of the optical viewing angles resulting from these designs is usually very small—typically less than 8 mm. Hence, the performance of the optical system is very sensitive, even for small movements of the optical system relative to the eye of a viewer, and does not allow sufficient pupil motion for comfortable reading of a text from such displays.

The teachings included in Publication Nos. WO 01/95027, WO 03/081320, WO2005/024485, WO2005/024491, WO2005/024969, WO2005/124427, WO2006/013565, WO2006/085309, WO2006/085310, WO2006/087709, WO2007/054928, WO2007/093983, WO2008/023367, WO2008/12.9539, WO2008/149339 and WO2013/175465, all in the name of Applicant, are herein incorporated by reference.

DISCLOSURE OF THE INVENTION

The present invention facilitates the exploitation of very compact light-guide optical element (LOE) for, amongst other applications, HMDs. The invention allows relatively wide FOVs together with relatively large EMB values. The resulting optical system offers a large, high-quality image, which also accommodates large movements of the eye. The optical system disclosed by the present invention is particularly advantageous because it is substantially more compact than state-of-the-art implementations and yet it can be readily incorporated even into optical systems having specialized configurations.

A broad object of the present invention is therefore to alleviate the drawbacks of prior art compact optical display devices and to provide other optical components and systems having improved performance, according to specific requirements, In accordance with the present invention, there is provided an optical system, comprising a light-transmitting substrate having at least two major surfaces and. edges; an optical prism having at least a first, a second and a third surface, for coupling light waves having a given field-of-view into the substrate by total internal reflection; at least one partially reflecting surface located in the substrate, the partially reflecting surface being orientated non-parallelly with respect to the major surfaces of said substrate, for coupling light waves out of the substrate; at least one of the edges of the substrate is slanted at an oblique angle with respect to the major surfaces; the second surface of the prism is located adjacent to the slanted edge of the substrate, and a part of the substrate located next to the slanted edge is substantially transparent, characterized in that the light waves enter the prism through the first surface of the prism, traverse the prism without any reflection and enter the substrate through the slanted edge.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 illustrates a span of optical rays which are coupled into an LOE, according to the present invention;

FIG. 2 illustrates a span of optical rays which illuminates the input aperture of an LOE;

FIG. 3 illustrates a prior art side view of an exemplary coupling-in mechanism comprising a prism optically attached to one of the major surfaces of the LOE;

FIG. 4 is an another schematic diagram illustrating a side view of a prior art exemplary coupling-in mechanism comprising a prism optically attached to one of the major surfaces of the LOE;

FIG. 5 illustrates a span of optical rays illuminating the input aperture of an LOE wherein one of the edges of the LOE is slanted at an oblique angle with respect to the major surfaces;

FIG. 6 is a schematic diagram illustrating another system with a span of optical rays illuminating the input aperture of an LOE, wherein one of the edges of the LOE is slanted at an oblique angle with respect to the major surfaces;

FIG. 7 is a schematic diagram illustrating an embodiment of an optical system coupling-in input light waves from a display light source into a substrate, having an intermediate prism attached to the slanted edge of the LOE, in accordance with the present invention;

FIG. 8 illustrates another embodiment of an optical system coupling-in input light waves from a display light source into a substrate, having an intermediate prism attached to the slanted edge of the LOE, in accordance with the present invention;

FIG. 9 is a schematic diagram illustrating a device for collimating input light waves from a display light source, by utilizing a polarizing beamsplitter, in accordance with the present invention, FIG. 10 is a schematic diagram illustrating a device for collimating input light waves from liquid crystals on silicon (LCOS) light source, in accordance with the present invention;

FIGS. 11A and 11B are two embodiments showing a top view of eyeglasses according to the present invention; and FIG. 12 is a schematic flow diagram of a method for manufacturing a display in accordance with the present invention.

DETAILED DESCRIPTION OF PREFERRED EMBODIMENTS

Figure 1:
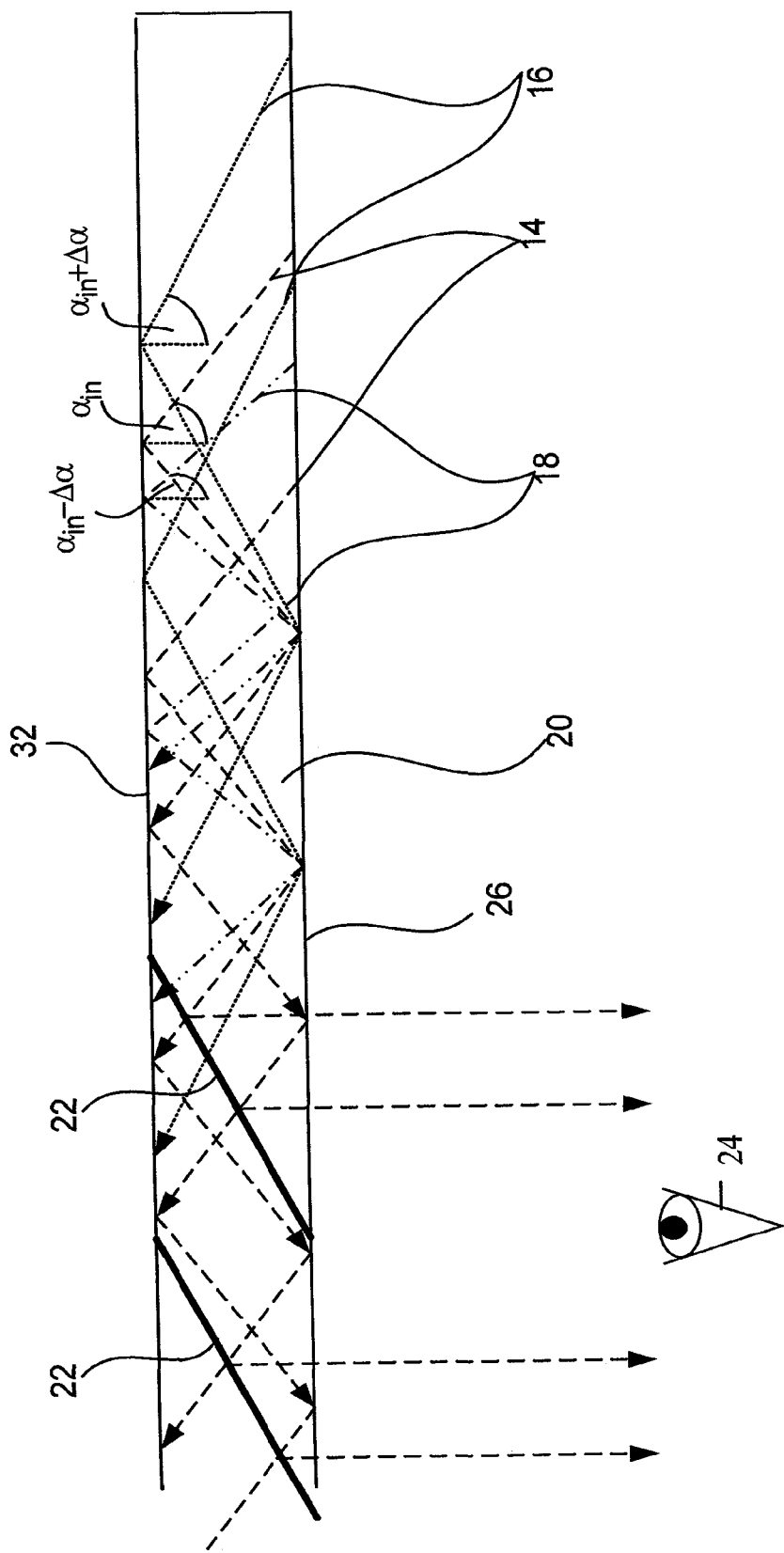

The present invention relates to substrate-guided optical devices, in particular, compact HMD optical systems. Usually, a collimated image having a finite FOV is coupled into a substrate. As illustrated in FIG. 1, the image inside an LOE or, hereinafter, a substrate 20 contains a span of plane waves having central waves 14 and marginal waves 16 and 18. The angle between a central wave 14 of the image and the normal to the plane of the major surfaces 26, 32 is $\alpha_{in}$. The FOV inside the substrate 20 is defined as $2\cdot\Delta\alpha$. Consequentially, the angles between the marginal waves 16 and 18 of the image and the normal to the plane of the major surfaces are $\alpha_{in}+\Delta\alpha$ and $\alpha_{in}-\Delta\alpha$, respectively. After several reflections off the surfaces 26, 32 of the substrate 20, the trapped waves reach an array of selectively reflecting surfaces 22, which couple the light waves out of the substrate into an eye 24 of a viewer. For simplicity, only the rays of the central waves 14 are plotted as being coupled-out from the substrate.

Figure 2:
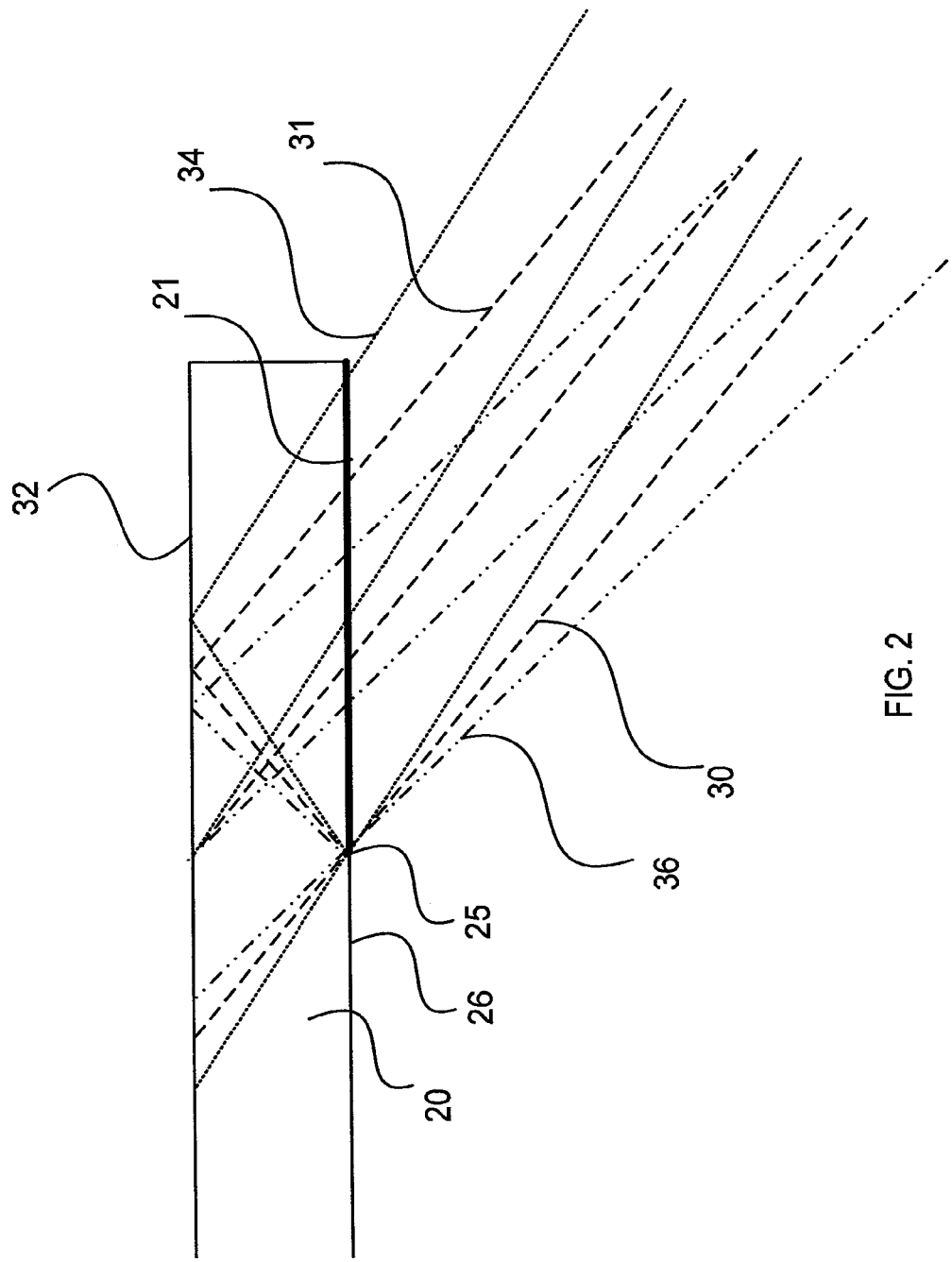

The object of the present invention is to find a light wave coupling-in mechanism which is different to the coupling-in mechanism of the prior art and having more compact dimensions. In FIG. 2, there is illustrated a span of rays that have to be coupled into substrate 20, with a minimal required input aperture 21. In order to avoid an image with gaps or stripes, the points on the boundary line 25, between the edge of the input aperture 21 and the lower surface 26 of the substrate 20, should be illuminated for each one of the input light waves by two different rays that enter the substrate from two different locations: one ray 30 that illuminates the boundary line 25 directly, and another ray 31, which is first reflected by the upper surface 32 of the substrate before illuminating the boundary line 25. The size of the input aperture 21 is usually determined by two marginal rays: the rightmost ray 34 of the highest angle of the FOV, and the leftmost ray 36 of the lowest angle of the FOV.

Figure 3:
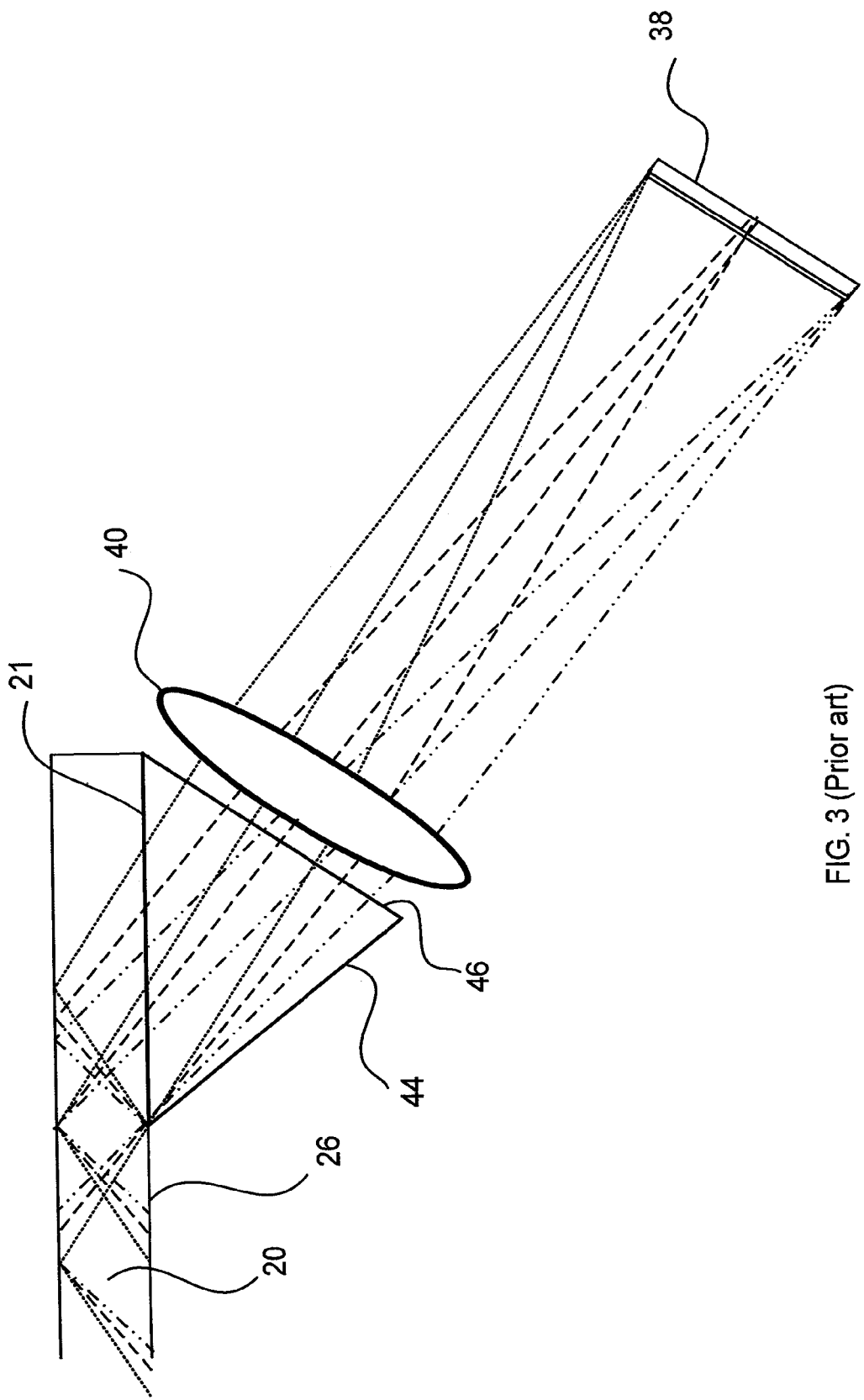

A possible embodiment for coupling the marginal rays into the substrate 20 is illustrated in FIG. 3. Here, the input light waves source 38, as well as a collimating module 40, e.g., a collimating lens, are oriented at the required off-axis angle compared to the major surfaces 26, 32 of the substrate 20. A relay prism 44 is located between the collimating module 40 and the substrate 20 and is optically cemented to the lower surface 26 of the substrate 20, such that the light rays from the display source 38 impinge on the major surface 26 at angles which are larger than the critical angle, for total internal reflection inside the substrate. As a result, all the optical light waves of the image are trapped inside the substrate by total internal reflection from the major surfaces 26 and 32. Although the optical system illustrated here is simple, it is still not the roost compact coupling-in mechanism. This is an important point for optical systems which should conform to the external shape of eyeglasses, as well as to hand-held or other displays.

In order to minimize the dimensions of the collimating module 40, the aperture $D_T$ of the input surface 46 of the coupling-in prism 44 should be as small as possible. As a result, the dimensions of the coupling-in prism would also be minimized accordingly, while the coupled rays of the entire FOV will pass through the coupling-in prism 44.

Figure 4:
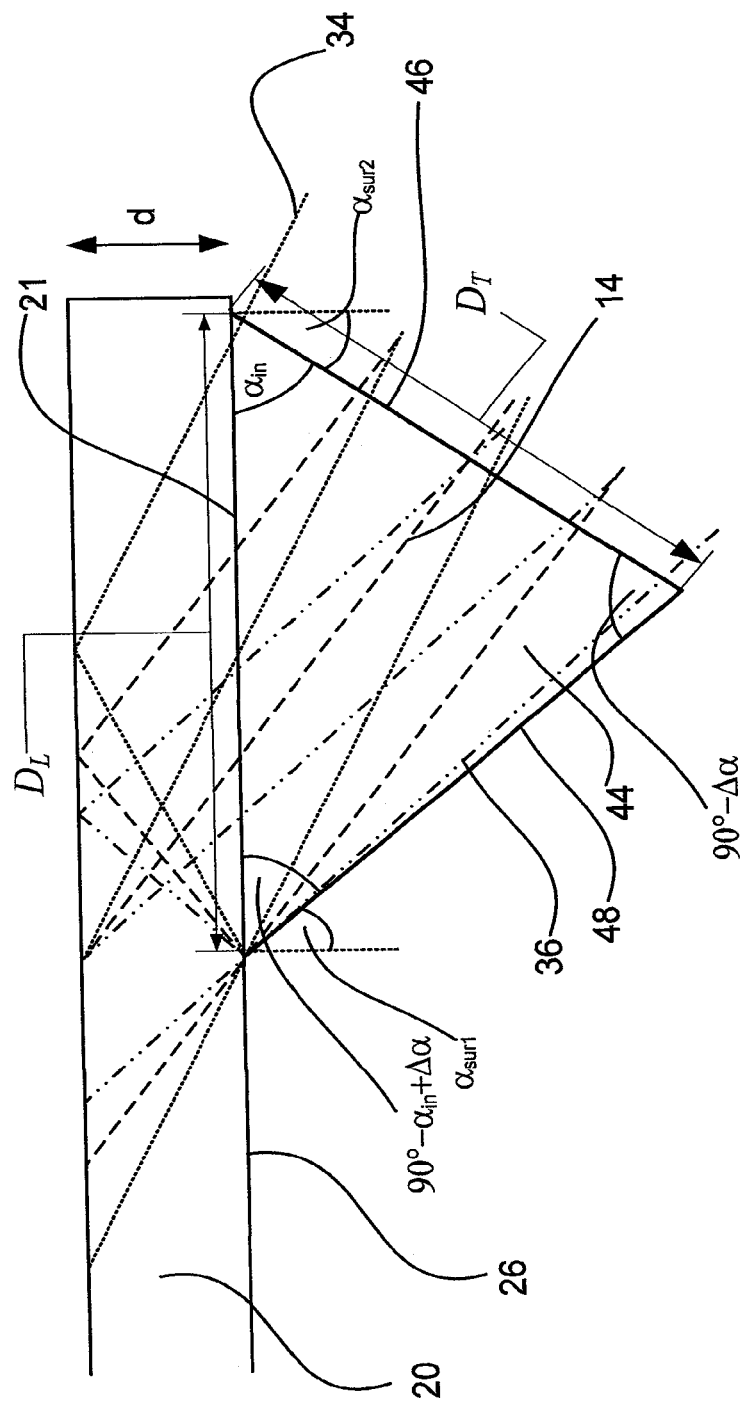

As illustrated in FIG. 4, in order for the rightmost ray 34 of the highest angle of the FOV to pass through the prism 44, the aperture $D_L$ of the output surface 21 of the prism 44 must fulfil the relation $$D_L \geq 2d\cdot\tan(\alpha_{in}+\Delta\alpha) \quad (1)$$

wherein d is the thickness of the substrate 20,

In addition, in order for the leftmost ray 36 of the lowest angle of the FOV to pass through the prism 44, the angle $\alpha_{sur1}$ between the left surface 48 of the prism 44 and the normal to the major surface 26 of the substrate 20 must fulfil the relation $$\alpha_{sur1} \leq \alpha_{in}-\Delta\alpha \quad (2)$$

For minimizing the chromatic aberrations of the optical waves passing through the prism 44, it is advantageous to orient the input surface 46 of the coupling-in prism 44 to be substantially normal to the central wave 14 of the image. As a result, the angle $\alpha_{sur2}$ between the entrance surface 46 of the prism 44 and the normal to the major surface 26 of the substrate 20 is $$\alpha_{sur2} = 90°-\alpha_{in} \quad (3)$$

Taking the inequality of Eq. 2 to the limit, in order to minimize the dimensions of the prism 44 yields the following internal angles of the prism: the angle between the surfaces 46 and 21 is $\alpha_{in}$; the angle between surface 48 and 21 is $90°-\alpha_{in}+\Delta\alpha$. Consequentially, the angle between surfaces 46 and 48 is $90°-\Delta\alpha$. Utilizing these values yields $$D_T = \frac{D_L}{\sin(90°-\Delta\alpha)} \cdot \sin(90°-\alpha_{in}+\Delta\alpha) \quad (4)$$

Taking the inequality of Eq. 1 to the limit and inserting it in Eq. 4 yields $$D_T = \frac{2d\cdot\tan(\alpha_{in}+\Delta\alpha)}{\cos(\Delta\alpha)} \cdot \cos(\alpha_{in}-\Delta\alpha) \quad (5)$$
$$= \frac{2d\cdot\sin(\alpha_{in}+\Delta\alpha)\cdot\cos(\alpha_{in}-\Delta\alpha)}{\cos(\Delta\alpha)\cdot\cos(\alpha_{in}+\Delta\alpha)}$$

Although the optical system illustrated in FIGS. 3 and 4 seems to be simple, it is still not the most compact coupling-in mechanism, since it is important for such optical systems to conform to the external shape of displays such as eyeglasses or hand-held displays.

Figure 5:
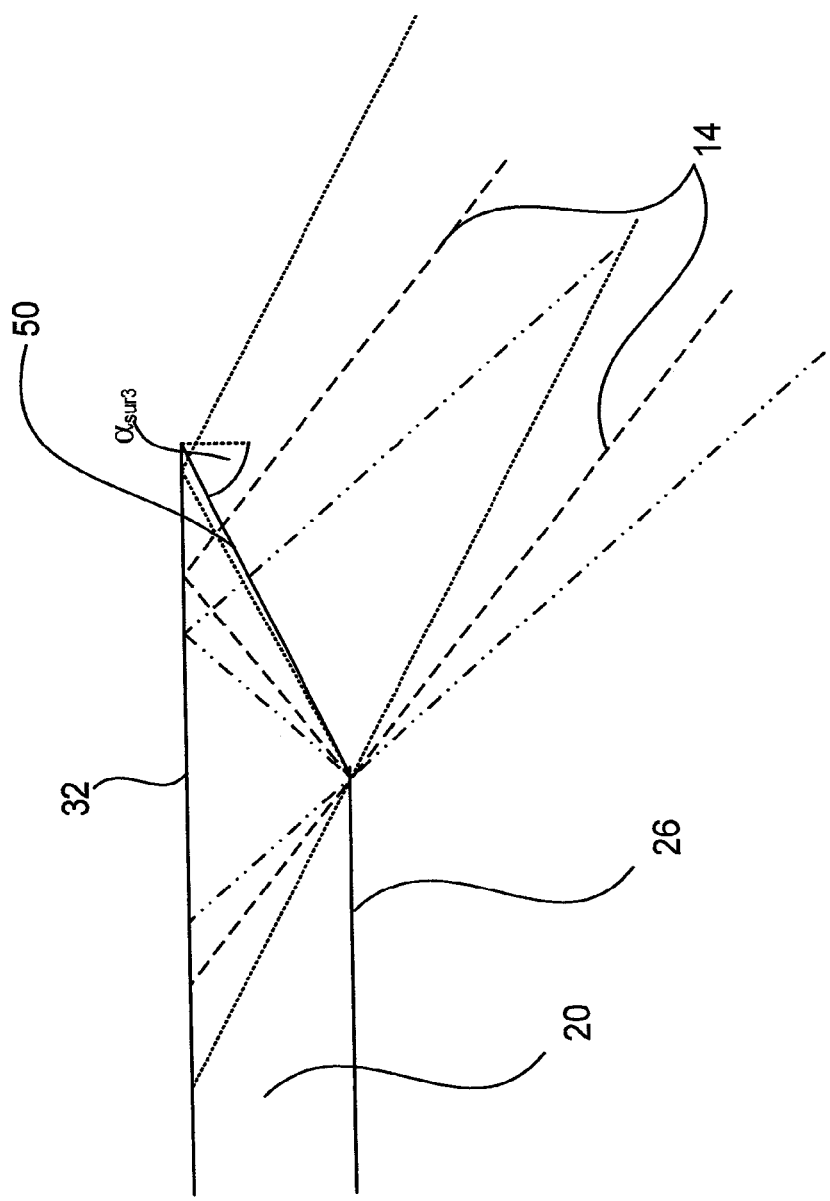

FIG. 5 illustrates an alternative embodiment of coupling light waves into the substrate through one of its edges. Here, the light waves-transmitting substrate 20 has two major parallel surfaces 26 and 32 and edges, wherein at least one edge 50 is oriented at an oblique angle with respect to the major surfaces and wherein $\alpha_{sur3}$ is the angle between the edge 50 and the normal to the major surfaces of the substrate. Usually the incoming collimated light waves are coupled directly from the air, or alternatively, the collimating module 40 (FIG. 3) can be attached to the substrate 20. As a result, it is advantageous to couple the central wave 14 normal to the slanted surface 50 for minimizing chromatic aberrations. Unfortunately, this requirement cannot be fulfilled by coupling the light directly through surface 50. Usually, even for coupled images having a moderate FOV, the angle $\alpha_{in}$ (FIG. 3) between the central wave 14 of the image and the normal to the plane of the major surfaces has to fulfil the requirement $\alpha_{in} \geq 50°$. As a result, if the central wave 14 is indeed normal to the slanted surface 50, then the relation $\alpha_{sur3} \leq 40°$ must be fulfilled. Consequentially, the outcome will be the fulfilment of the relations in the system $\alpha_{sur3} < \alpha_{in}$ and, for a comparatively wide. FOV, even $\alpha_{sur3} << \alpha_{in} + \Delta\alpha$.

Figure 6:
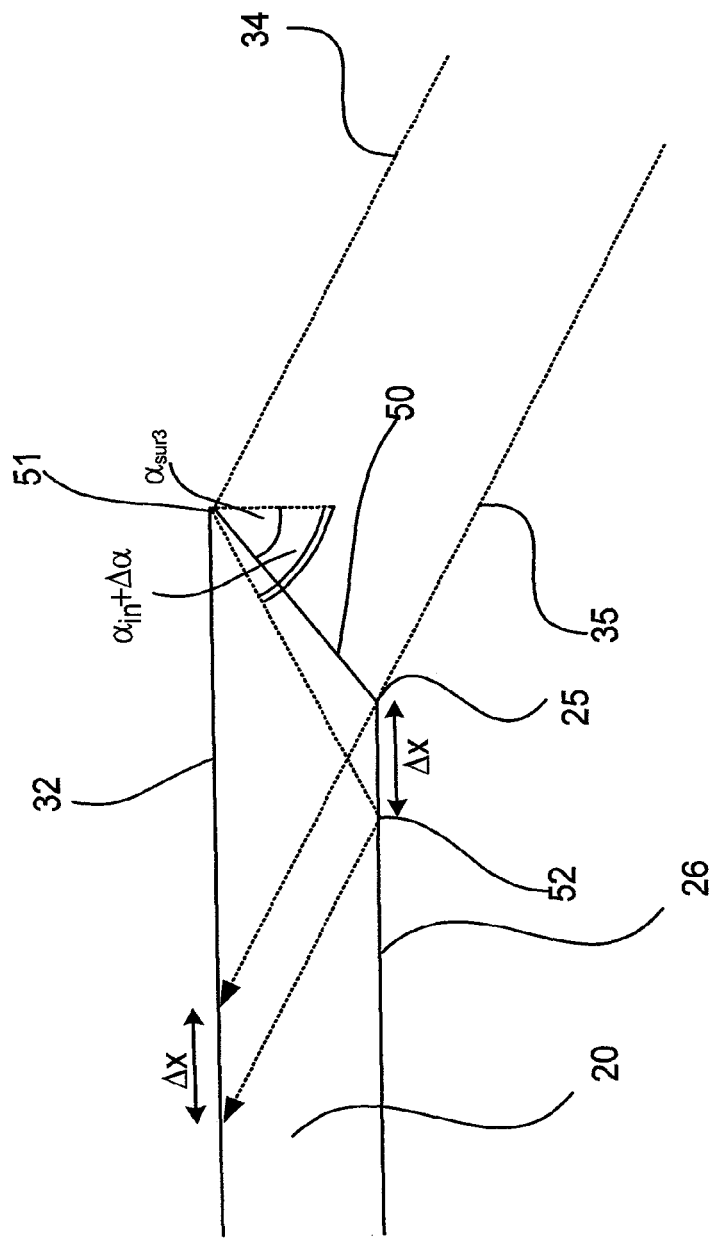

FIG. 6 illustrates the complex situation wherein the maximal angle between the trapped rays and the major surfaces 26, 32 is larger than the angle between the input surface 50 and the major surfaces. As illustrated, the points on the boundary line 25, between the edge of input aperture 50 and the lower surface 26 of substrate 20, are illuminated only by the leftmost ray 35 of the wave that directly illuminates the boundary line 25. The other marginal ray 34, which impinges on the edge 51 of the input surface 50, is first reflected by the upper surface 32 prior to illuminating the lower surface at a different line 52 which is located at a distance $\Delta x$ from the boundary line 25. As illustrated, the gap $\Delta x$ is not illuminated at all by the trapped rays of the marginal wave 34. Consequentially, dark stripes will appear and the coupled-out waves and the image quality will be significantly inferior.

Figure 7:
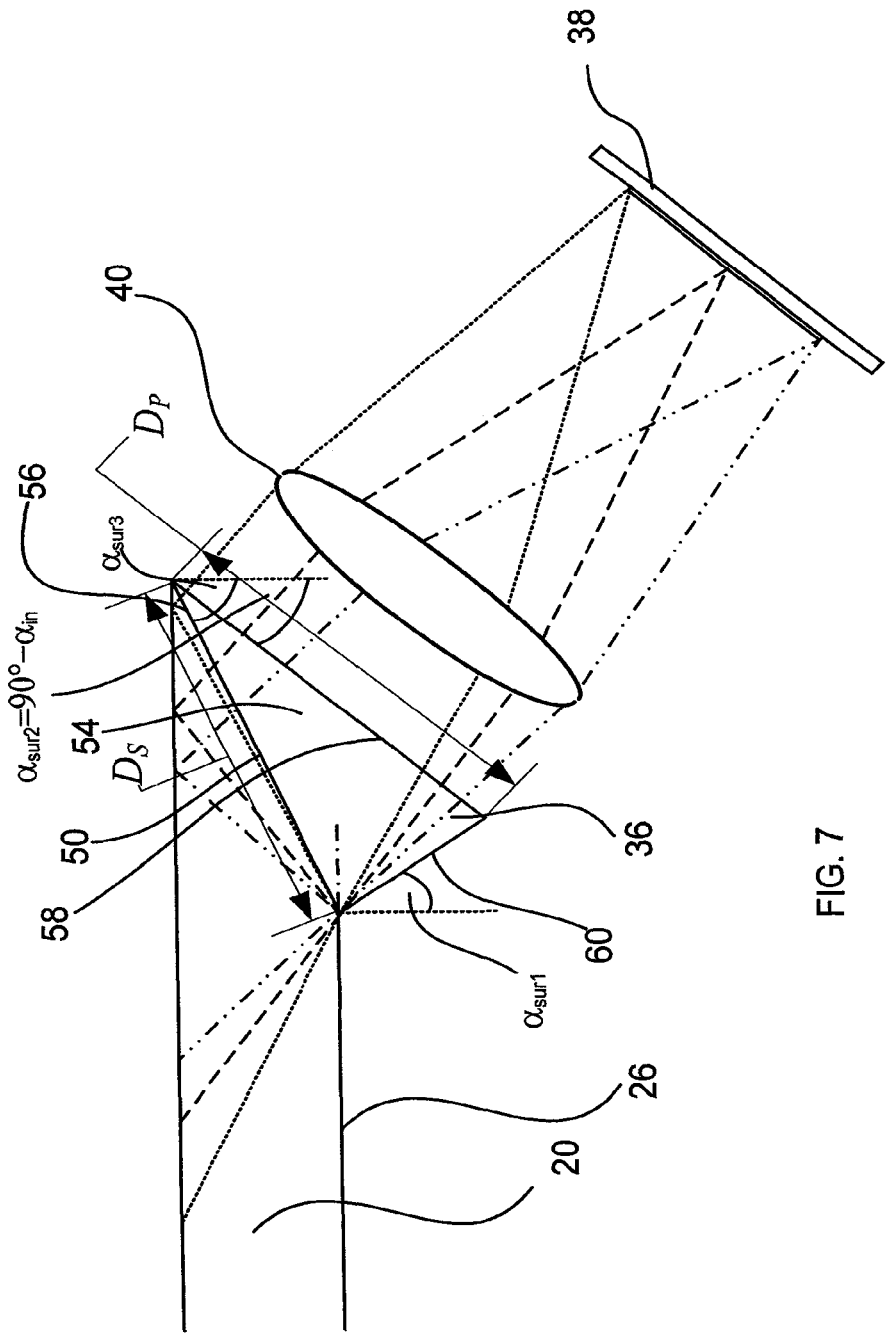

This situation is solved by the embodiment shown in FIG. 7. An intermediate prism 54 is inserted between the collimating module 40 (FIG. 3) and the slanted edge 50 of the substrate. One of the prism's surfaces 56 is located adjacent to the slanted edge 50 of the substrate 20. In most cases, the refractive index of the intermediate prism should be similar to that of the substrate 20. Nevertheless, there are cases wherein a different refractive index might be chosen for the prism, in order to compensate for chromatic aberrations in the system. The incoming light waves are coupled directly from the air, or alternatively, the collimating module 40, can be attached to the intermediate prism 54.

Thus, manufacturing of the display, illustrated schematically in FIG. 12 as method 200, includes providing LOE 20 formed with slanted edge 50 (step 202) and attaching a triangular prism 54 to slanted edge 50 to provide a coupling-in surface 58 (step 204). The image projector, including a collimating module 40 for delivering a collimated image, is aligned and attached to the coupling-in surface 58 (step 206).

In many cases, the refractive index of the collimating module 40 is substantially different than that of the substrate 20, and accordingly, is different from that of the prism 54. Therefore, for minimizing the chromatic aberrations, the input surface 58 of the prism 54 should be oriented substantially normal to the central light wave of the incoming ray. In addition, the leftmost ray of the lowest angle of the FOV should pass through the prism 54. As a result, the conditions of Eqs. (2) and (3) should be fulfilled also for the configuration of FIG. 7. To eliminate the undesired phenomena of dark stripes as described with reference to FIG. 6, the relation $$\alpha_{sur3} \geq \alpha_{in} + \Delta\alpha \qquad (6)$$

must be satisfied, namely, the angle between the slanted edge of the substrate and the normal to the major surfaces of the substrate is larger than the highest angle of the FOV. Accordingly, the aperture D of the output surface 56 of the prism 54 must fulfil the relation $$D_S \geq \frac{d}{\cos(\alpha_{in} + \Delta\alpha)} \qquad (7)$$

Apparently, since the light waves enter the prism 54 through the entrance surface 58 of the prism, directly cross the prism without any reflections and enter the substrate through the slanted edge 50, the expansion of the active area $D_p$ of the entrance surface 58 in relation to the aperture $D_s$ of the exit surface 56, is minimal. In addition, as described above, in order for the leftmost ray 36 (FIG. 4) of the lowest angle of the FOV to pass through the prism 54, the angle $\alpha_{sur1}$ between the left surface 60 of the prism 54 and the normal to the major surface 26 of the substrate must also fulfil the relation of Eq. (2), namely, the angle between the surface 60 of the prism 54 and the normal to the major surfaces of the substrate, is smaller than the lowest angle of the FOV. Therefore, when the relations of Eqs. (2), (6) and (7) are fulfilled, the coupled-in light waves from the entire FOV will completely cover the major surfaces of the substrate without any stripes or gaps.

Figure 8:
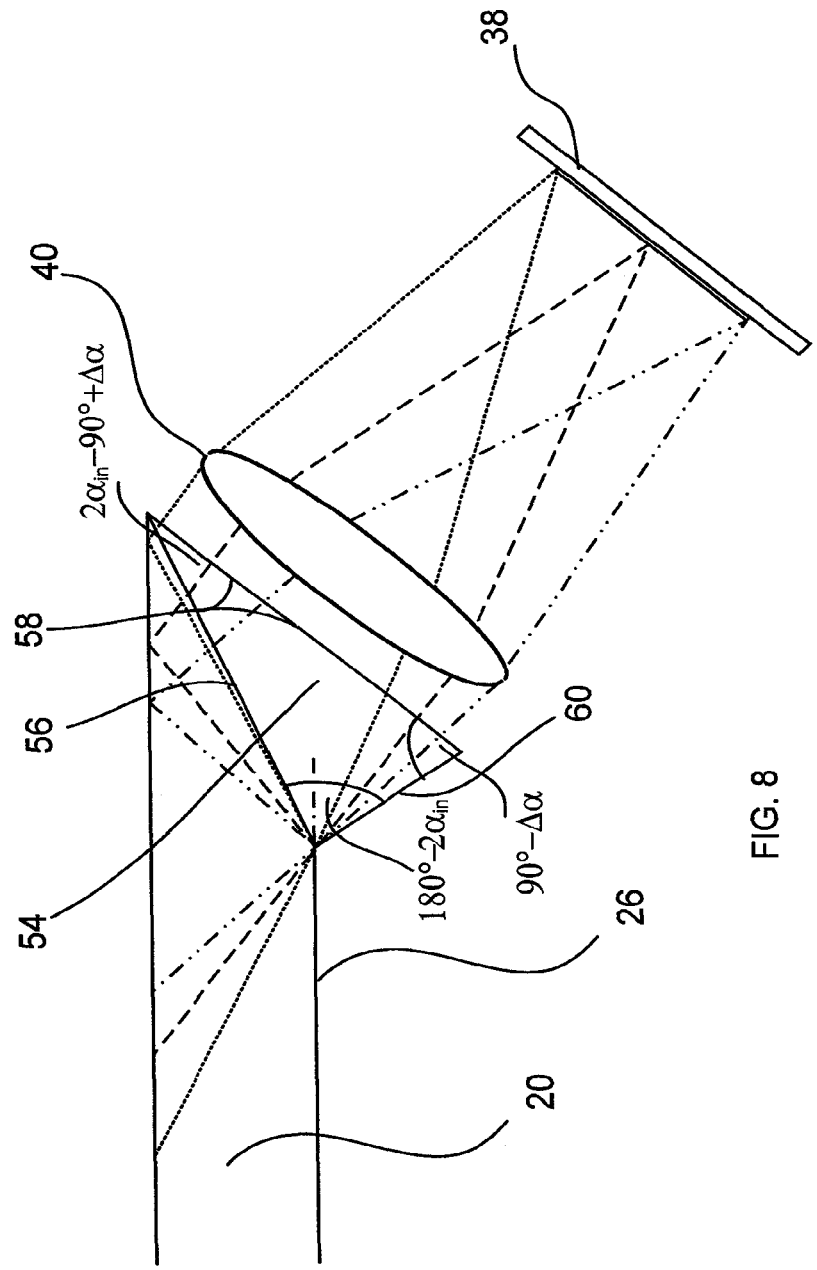

As illustrated in FIG. 8, by taking the inequalities of Eqs. (2), (6) and (7) to the limit, the internal angles of the prism 54 are: the angle between the surfaces 56 and 58 is $2\alpha_{in} - 90 + \Delta\alpha$ and the angle between surface 56 and 60 is $180° - 2\alpha_{in}$. Consequentially, the angle between surfaces 58 and 60 is $90° - \Delta\alpha$. Utilizing these values yields $$D_P = \frac{\frac{d}{\cos(\alpha_{in} + \Delta\alpha)}}{\cos(\Delta\alpha)} \cdot \sin[2 \cdot (90° - \alpha_{in})] \qquad (8)$$
$$= \frac{2d \cdot \sin(\alpha_{in}) \cdot \cos(\alpha_{in})}{\cos(\Delta\alpha) \cdot \cos(\alpha_{in} + \Delta\alpha)}$$

wherein $D_P$ is the active area of the input surface 58 of the intermediate prism 54.

Therefore, by comparing Eqs. (5) and (8), the relation between the active areas $D_P$ and $D_T$ of the input surfaces of the prisms 54 and 44 of the prior art system of FIG. 4, respectively, is:

$$\frac{D_P}{D_T} = \frac{\sin(\alpha_{in}) \cdot \cos(\alpha_{in})}{\sin(\alpha_{in} + \Delta\alpha) \cdot \cos(\alpha_{in} - \Delta\alpha)} \qquad (9)$$

Apparently, for a narrow FOV, that is, $\Delta\alpha << \alpha_{in}$, the improvement is negligible. However, for a relatively wide FOV the active area $D_P$ of the prism 54 should be reduced considerably compared to the active area $D_T$ of the prism 44.

For example, for $\Delta\alpha=12°$ and $\alpha_{in}=52°$ the reduction ratio of Eq. (9) has a significant value of $D_F/D_T \approx 0.7$.

Figure 9:
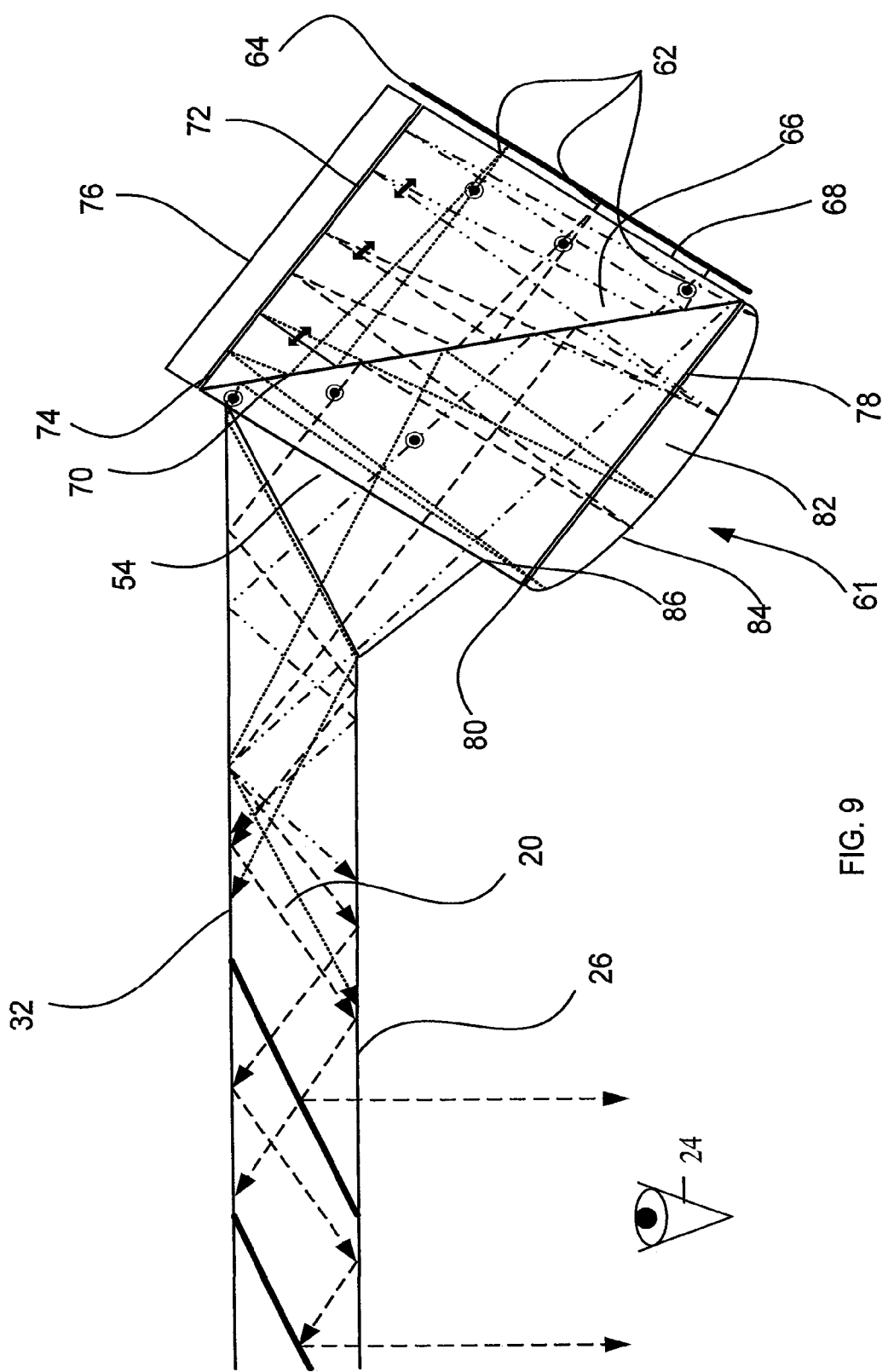

In the embodiment illustrated in FIG. 3, the collimating module 40 is shown to be a simple transmission lens, however, much more compact structures utilizing reflective lenses, polarizing beamsplitters and retardation plates may be employed. In such a structure, the fact that in most microdisplay light sources, such as LCDs or LCOS light sources, the light which is linearly polarized, is exploited by optical component 61, as illustrated in FIG. 9. As shown, the s-polarized input light waves 62 from the display light source 64, are coupled into a light-guide 66, which is usually composed of a light waves transmitting material, through its lower surface 68. Following reflection-off of a polarizing beamsplitter 70, the light waves are coupled-out of the substrate through surface 72 of the light-guide 66. The light waves then pass through a quarter-wavelength retardation plate 74, reflected by a reflecting optical element 76, e.g., a flat mirror, return to pass again through the retardation plate 74, and re-enter the light-guide 66 through surface 72. The now p-polarized light waves pass through the polarizing beamsplitter 70 and are coupled out of the light-guide through surface 78 of the light-guide 66. The light waves then pass through a second quarter-wavelength retardation plate 80, collimated by a component 82, e.g., a lens, at its reflecting surface 84, return to pass again through the retardation plate 80, and re-enter the light-guide 66 through surface 78. The now s-polarized light waves reflect off the polarizing beamsplitter 70 and exit the light-guide through the exit surface 86, attached to the intermediate prism 54. The reflecting surfaces 76 and 84 can be materialized either by a metallic or a dielectric coating.

In the embodiment illustrated in FIG. 9, the display source can be an LCD panel, however, there are optical systems, especially wherein high brightness imaging characteristics are required, where it is preferred to utilize an LCOS light source device as a display light source. Similar to LCD panels, LCOS light source panels contain a two-dimensional array of cells filled with liquid crystals that twist and align in response to control voltages. With the LCOS light source, however, the cells are grafted directly onto a reflective silicon chip. As the liquid crystals twist, the polarization of the light is either changed or unchanged following reflection of the mirrored surface below. This, together with a polarizing beamsplitter, causes modulation of the light waves and creates the image. The reflective technology means that the illumination and imaging light beams share the same space. Both of these factors necessitate the addition of a special beamsplitting optical element to the module, in order to enable the simultaneous operations of the illuminating, as well as the imaging, functions. The addition of such an element would normally complicate the module and, when using an LCOS light source as the display light source, some modules using a frontal coupling-in element or a folding prism, would become even larger. For example, the embodiment of FIG. 9 could be modified to accommodate an LCOS light source by inserting another beamsplitter between the display source 64 and the beamsplitter 66. However, this modified version may be problematic for systems with a comparatively wide FOV, wherein the focal length of the collimating module is shorter than the optical path of the rays passing through the of double beamsplitter configuration.

Figure 10:
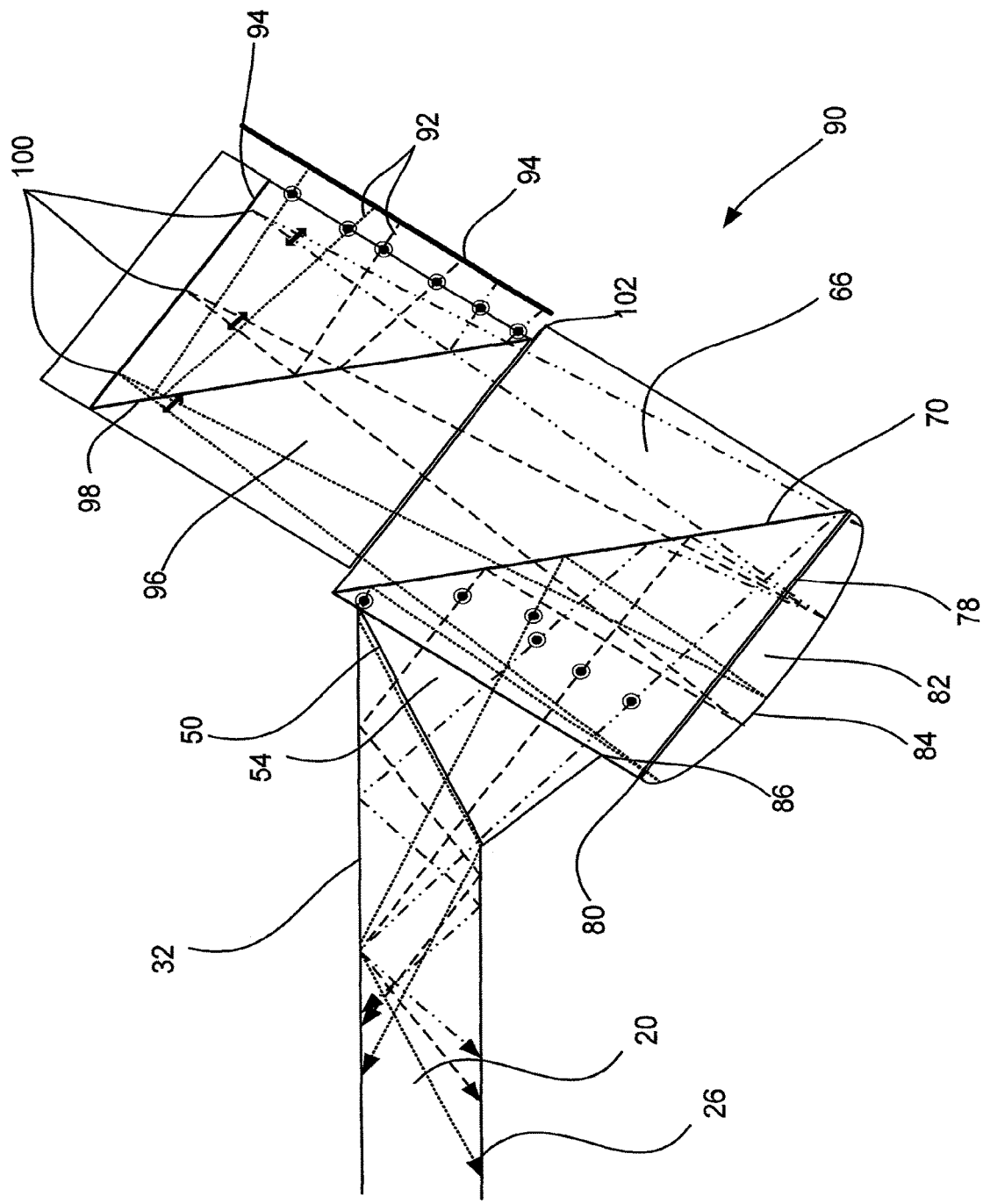

To solve this problem, as seen in FIG. 10, a modified optical component 90 is provided, wherein only one reflecting surface 84 is located adjacent to surface 78 of the light-guide 66. Hence, the optical path through this light-guide 66 is much shorter. As shown, the s-polarized light waves 92, emanating from a light source 94, enter the prism 96, reflect off the polarizing beamsplitter 98 and illuminate the front surface of the LCOS light source 100. The polarization of the reflected light waves from the "light" pixels is rotated to the p-polarization and the light waves are then passed through the beamsplitter 98, and consequentially, through a polarizer 102 which is located between the prisms 96 and 66 and blocks the s-polarized light which was reflected from the "dark" pixels of the LCOS light source 100. The light waves then enter the prism 66 and pass through the second beamsplitter 70, are coupled out of the prism through surface 78 of the prism 66, pass through a quarter-wavelength retardation plate 80, collimated by a collimating lens 82 at its reflecting surface 84, return to pass again through the retardation plate 80, and re-enter the prism 66 through surface 78. The now s-polarized light waves reflect off the polarizing beamsplitter 70 and exit the prism 66 through the exit surface 86, which is attached to the intermediate prism 54.

Returning now to FIG. 9, wherein the viewer's eye 24 is located at the same side of the slanted edge 50, the dimensions of the optical prism 66 are substantially extended over the lower major surface 26 of substrate 20 and only slightly extended over the upper surface 32. This slight extension can be completely eliminated with a proper design, for instance, by slightly increasing the angle $\alpha_{sur3}$ of the slant edge 50.

For the embodiment which is illustrated in FIG. 10, however, the optical component 90 is substantially extended over the lower surface 26 of the substrate 20, as well as over the upper surface 32.

Figure 11A:
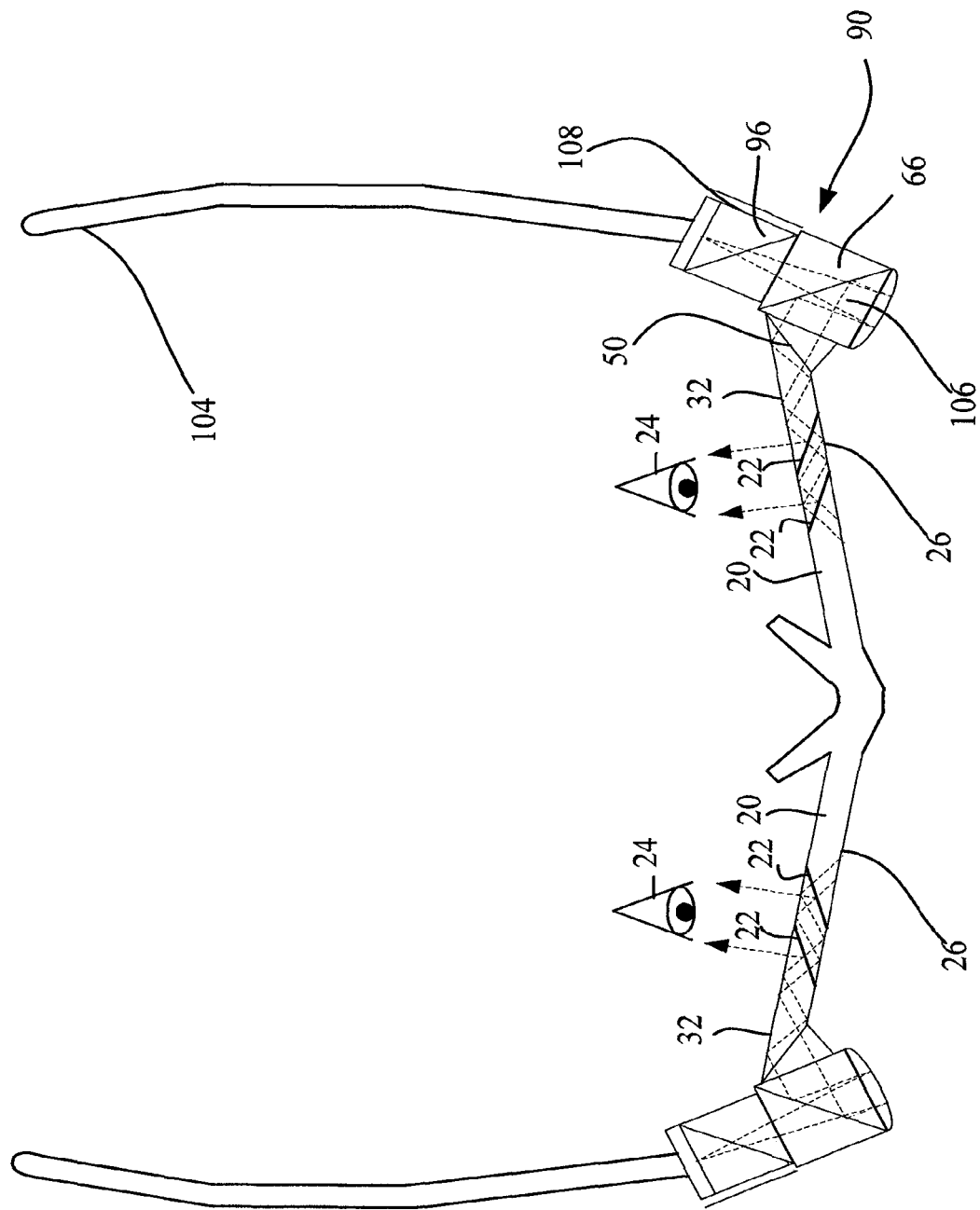

As illustrated in FIG. 11A, this unique configuration may be preferred for optical systems wherein a collimating module is composed of the optical component 90 of FIG. 10, having prisms 66 and 96. Optical component 90 is installed between the eyeglasses frame 104 and the substrate 20. In this case, the viewer's eye 24 is located on the opposite side of the slanted edge 50 of the substrate 20. The light waves are coupled into the substrate 20 through the slanted edge 50 towards the major surface 32, from which surface 32, it bounces towards the partially reflecting surfaces 22 and from there exit the substrate through the major surface 32 towards the viewer's eye 24. Even though there is a front extension 106 of the optical component 90 to the front part of the eyeglasses, the rear extension 108 of the prism 96 is minimal, and the entire optical component 90, can easily be integrated inside the frame 104 of the eyeglasses.

Seen in FIG. 11B is a modification based on the optical module illustrated in FIG. 9, wherein the viewer's eye 24 is located on the same side of the slanted edge 50 of the substrate 20. The light waves emanating from the optical component 90 are coupled into the substrate 20 through the slanted edge 50, enter the substrate 20 towards the major surface 26, from which surface it bounces towards the major surface 32 and from there it continues towards the partially reflecting surfaces 22, and exit the substrate though the major surface 32 towards the viewer's eye 24.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for manufacturing a display, the method comprising the steps of:
   (a) providing a light-guide optical element (LOE) having a pair of parallel planar major external surfaces for guiding image illumination by internal reflection from said major external surfaces, said LOE having a coupling-out configuration for redirecting image illumination propagating within said LOE outwards towards an eye of an observer, said LOE having a planar slanted edge surface extending between said pair of parallel major external surfaces, said slanted edge surface being at a first acute angle to a normal to said major external surfaces;
   (b) attaching to said slanted edge surface a triangular intermediate prism, said intermediate prism presenting a planar coupling-in surface at a second acute angle to the normal to said major external surfaces; and
   (c) aligning with said coupling-in surface an image projector comprising a collimating optical arrangement for projecting image illumination corresponding to a collimated image, said image projector being aligned to inject the image illumination as a collimated image through said coupling-in surface so as to enter said LOE via said slanted edge and to propagate as a collimated image within said LOE by internal reflection at said major external surfaces until being redirected by said coupling-out configuration towards the eye of the observer.

2. The method of claim 1, wherein said second acute angle is smaller than said first acute angle.

3. The method of claim 1, wherein said coupling-out configuration comprises a plurality of mutually-parallel partially-reflecting internal surfaces located between, and obliquely angled relative to, said major external surfaces.

4. The method of claim 1, wherein said image projector comprises at least one polarized beam splitter prism, and wherein said collimating optical arrangement comprises at least one reflective lens associated with an external surface of said polarized beam splitter prism, said aligning comprising attaching said polarized beam splitter to said coupling-in surface so that there is no air gap in an optical path from said collimating optical arrangement to said LOE.

5. The method of claim 1, wherein said intermediate prism has a refractive index matching a refractive index of said LOE.

* * * * *